INVENTOR
KASPAR RITTER

United States Patent Office 3,131,540
Patented May 5, 1964

3,131,540
HYDROSTATIC DRIVE, PARTICULARLY FOR AUTOMOTIVE VEHICLES
Kaspar Ritter, Kirchheim, Teck, Germany, assignor to Kopat Gesellschaft für Konstruktion, Entwicklung und Patentverwertung m.b.H. & Co. KG., Goppingen, Germany, a corporation of Germany
Filed Apr. 19, 1962, Ser. No. 188,796
Claims priority, application Germany Apr. 20, 1961
3 Claims. (Cl. 60—53)

The present invention relates to a hydrostatic drive, particularly for automotive vehicles, which drive is equipped with a filling pump for continuous feeding of working fluid into the inner flow circle of the drive, which working fluid serves simultaneously as a lubricating means.

Drives are already known, in which a valve for disconnecting the drive is inserted between the pressure side and the suction side of the drive and which valve is reversible by means of the pressure in the filling conduit.

Upon reducing the pressure of, for instance, about 5 atmospheres in the filling conduit by opening of a normally closed return conduit with a safety valve adjusted to the reduced idler pressure of, for instance, 2 atmospheres, the fluid quantity fed during a time unit to the hydrostatic drive is correspondingly automatically reduced, particularly, since the operation of the clutch is generally connected with a reduction of the number of revolutions of the driving motor and, thereby, also of the filling pump driven by the motor. In this state of operation with reduced pressure and smaller quantity of fluid fed through the filling conduit into the drive an appreciable danger exists, that not all bearing points of the drive are sufficiently supplied with lubricating means, and thereby, overheat.

The basic structure of the present drive is disclosed in U.S. Patent No. 2,687,049 to Heinrich Ebert and comprises a hollow output shaft, a primary fluid operable cylinder piston arrangement arranged within the output shaft, a secondary fluid operable cylinder piston arrangement mounted within the output shaft, first swash plate means operable by the primary cylinder piston arrangement, second swash plate means operable by the secondary fluid operable cylinder piston arrangement, fluid control means arranged for cooperation with the first and second cylinder arrangements, means drivingly connecting the first and the second swash plate means with the output shaft, and drive shaft means extending through an opening in the output shaft and drivingly connected to the cylinder bodies of the primary and the secondary cylinder piston arrangements for rotating the cylinder bodies.

It is the main object of the present invention to provide a hydrostatic drive, particularly for automotive vehicles, wherein a sufficient lubrication of the bearing points of the primary pump part is assured, which primary pump part continues to operate even in case the latter is disconnected from the non-rotating secondary motor part.

It is another object of the present invention to provide a hydrostatic drive, particularly for automotive vehicles, wherein a reversing valve for two different lubrication paths is arranged in the filling conduit within the drive, which reversing valve is in automatically operating, cooperative connection with the disconnecting valve. The full-automatically working reversing valve in the filling conduit locks simultaneously the main lubricating oil flow circle for the oil-feed to all bearing points within the drive and leaves open merely an auxiliary channel upon reduction of the filling pressure to a value rendering operative the disconnecting valve, the lubricating oil being fed through the auxiliary channel only to those bearings which operate during the idling of the drive.

It is still another object of the present invention to provide a hydrostatic drive, particularly for automotive vehicles, in which the reversing valve for the two lubrication oil paths simultaneously is formed also preferably as an adjustable pressure limiting valve for the filling pressure. The structural combination of a reversing valve with a pressure limiting valve amounts to an appreciably constructive simplification, which effectively has a beneficial effect upon the manufacturing costs, and first of all, upon the space required for the structure.

It is yet another object of the present invention to provide a hydrostatic drive, particularly for automotive vehicles, wherein a throttle is arranged in the idling lubrication oil path to the primary part of the hydrostatic drive during the operation of the motor. By means of such throttle it is assured, that the minimum pressure of, for instance, 2 atm., to which the pressure has been reduced in the return conduit by a safety valve for the disconnection of the drive, is maintained also during the idling number of revolutions of the driving motor, which is required, in order to maintain the pistons of the hydrostatic drive in engagement with their corresponding pressure disks.

With these and other objects in view, which will become apparent in the following detailed description, the present invention will be clearly understood in connection with the accompanying drawing, in which.

Figure 1:
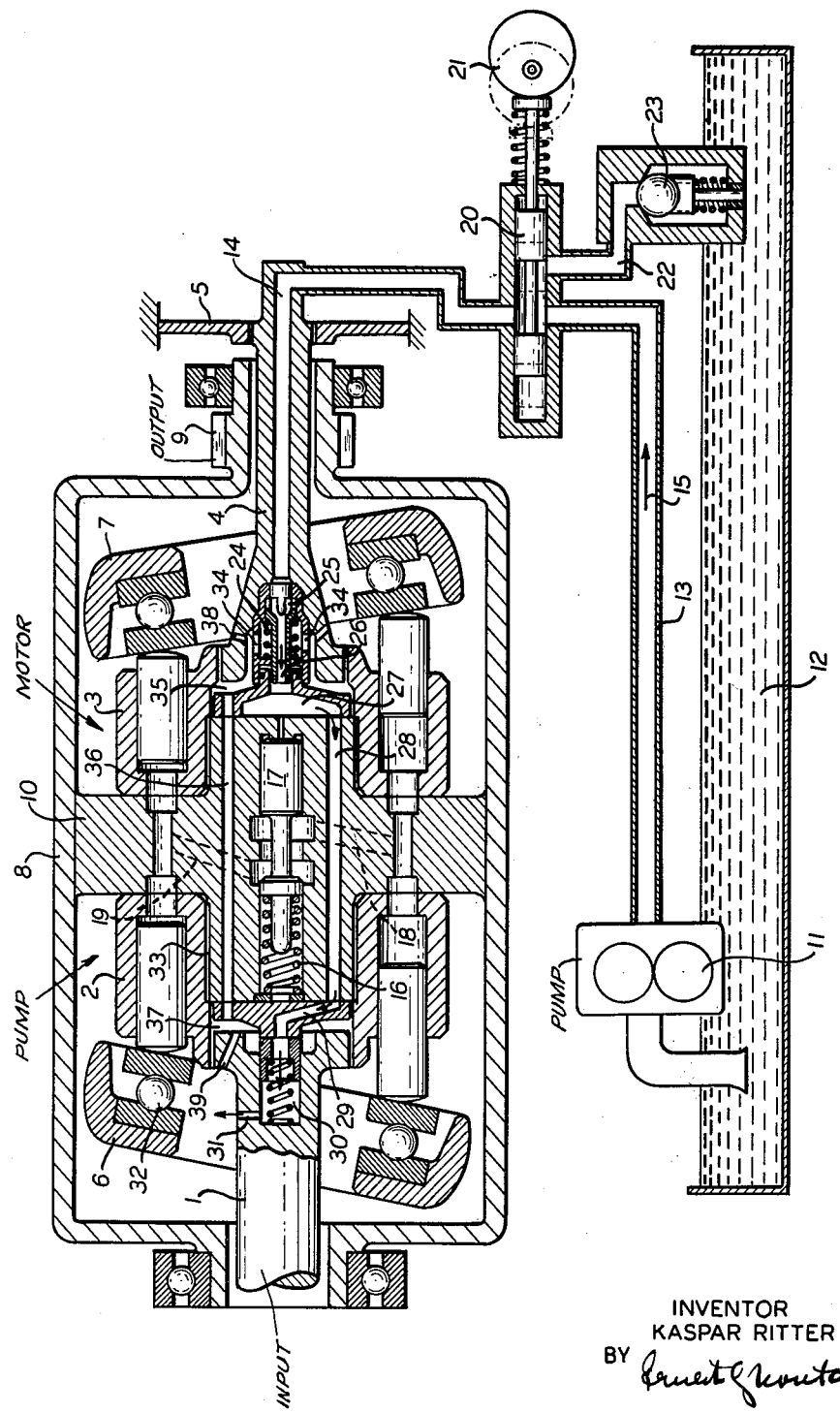
FIGURE 1 is an axial section of the drive designed in accordance with the present invention.

Referring now to the drawings indicating the drive of the present invention in a schematical longitudinal section, the drive comprises a drive shaft 1 which is coupled with a driving motor (not shown) and which is connected for continuous joint rotation with a piston drum 2 of a primary part formed as an axial piston pump. The piston drum 3 of the secondary part, likewise formed as an axial piston pump, is supported by a holding shaft 4 on the non-rotating housing 5. The swash plates 6 and 7, respectively, of the primary and secondary parts are swingably mounted in a common rotary housing 8, which serves simultaneously for the transmission of the output of the drive by means of a pinion 9 and which is rigidly connected with the control disk 10.

Figure 2:
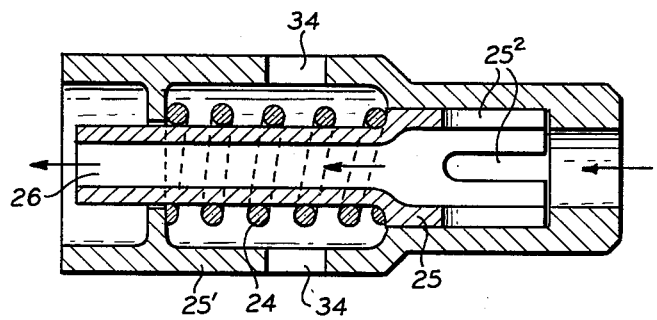
FIG. 2 is an axial section of the piston valve in idling position.
Figure 3:
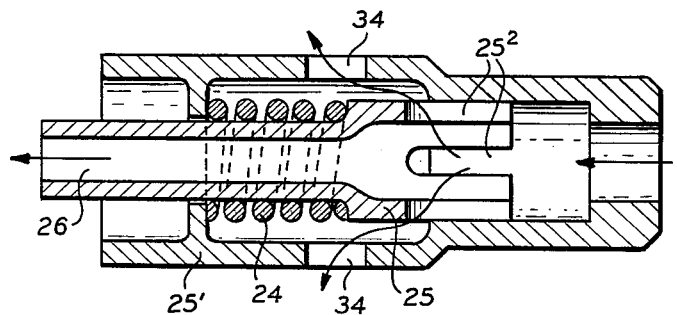
FIG. 3 is an axial section of the piston valve in operative position.

Working fluid is fed continuously in the direction of the arrow 15 into the inner flow circle of the drive by means of a filling pump 11, preferably driven by the input shaft 1 of the drive, through a filling conduit 13 from a drive fluid sump 12, and the fluid is fed through a channel 14 provided in the holding shaft 4, in order to equalize the losses caused by leakages and simultaneously to supply lubrication oil to the bearing points inside of the rotary housing 8. A disengaging valve 17, which is axially movable against the force of a spring 16, is disposed in a chamber of the control disk 10, which disengaging valve 17 releases in its right end position, as shown in the drawing, a direct communication between the pressure side and the suction side of the hydrostatic drive through the channels 18 and 19, so that the closed system of forces of the drive is interrupted. A reversing piston valve 25, biased by a pretensioned spring 24, is axially movable in a housing 25', having bores 34, which housing 25' is in communication with the channel 14 provided in the holding shaft 4, which piston valve 25 is maintained in the shown right end position in the position of the slide 20, shown in full lines, for the reduced filling pressure. In this position of the piston valve 25, shown in FIG. 2, the fluid, fed from the filling pump 11 through the conduit 13 and the channel 14, the pressure and quantity of which fluid is determined by the setting of the safety valve 23, can escape only through the bore 26 of the piston valve 25, the chamber 27, as well as the channels 28 and 29 into the chamber 30, and from there through the spraying nozzle 31 formed simultaneously as a throttling means, for the purpose of lubrication of the bearing parts 32 and 33 of the primary part rotating also in the disengaged position of the drive. One end of the piston valve 25 has a plurality of longitudinal slots $25^2$.

As soon as the return conduit 22 is closed by displacing the slide 20 into the position shown in dotted lines in the drawing by means of the cam 21, the pressure in the filling conduit 13 and in the channel 14 is increased to a value predetermined by the pretension of the spring 24 of the piston valve 25, which value is for instance 5 to 6 atm. Due to this pressure increase, the disengagement valve 17 is moved against the force of the spring 16 towards the left, from the position shown in the drawing, into its closing position and, thereby, the connection between the channels 18 and 19 is interrupted, so that the hydrostatic drive is now subjected to the closed system of the mechanical forces. The displacement, occurring simultaneously with movement of the piston valve 25 towards the left provides further another path for an increased discharge of the working fluid through the longitudinal slots $25^2$ of the piston valve 25, the openings 34 of the housing 25', the chamber 35, the channel 36 and the chamber 37, as well as the discharge bores 38 and 39 to all bearing points of the drive, which thus are continuously lubricated during their movement and cooled in the connected position of the drive.

While I have disclosed one embodiment of the present invention, it is to be understood that this embodiment is given by example only and not in a limiting sense, the scope of the present invention being determined by the objects and the claims.

I claim:

1. A hydrostatic drive, particularly for automotive vehicles, comprising
   a rotary housing,
   a control disk disposed crosswise in and secured to said rotary housing for common rotation therewith,
   a primary part formed as an axial piston type pump including a first piston drum,
   a secondary part formed as a piston type motor including a second piston drum,
   said primary part including a first swash plate,
   said secondary part including a second swash plate,
   said swach plates being swingably mounted in said rotary housing,
   the latter including a pinion adapted to transmit the output of said drive,
   said control disk including an inner pressure means flow circle of said drive,
   a driving shaft entering said rotary housing and connected with said first piston drum for joint rotation therewith,
   an immovable housing,
   a holding shaft projecting from said rotary housing,
   said second piston drum being supported on said immovable housing by means of said holding shaft,
   a filling pump having a pressure side and a suction side and a feeding conduit connected with said filling pump for feeding working fluid through said holding shaft, said working fluid, operating simultaneously as a lubricating means, into said inner pressure means flow circle of said drive,
   a spring biased disengaging valve disposed in said control disk and responding to a pressure difference in said feeding conduit to shift from a closing position into an open position,
   said drive having an idler lubrication path and an operative lubrication path,
   a reversing valve automatically cooperating with said disengagement valve and disposed inside of said drive, to shift the feeding of said lubrication means from one of said lubrication paths to the other of said lubrication paths in response to the pressure in said feeding conduit.

2. The hydrostatic drive, as set forth in claim 1, wherein said reversing valve includes adjustable means for limiting said pressure in said filling conduit.

3. The hydrostatic drive, as set forth in claim 1, wherein said idler lubrication path includes a throttle towards said continuously driven primary part of said hydrostatic drive.

References Cited in the file of this patent

UNITED STATES PATENTS 2,687,049    Ebert ------------------ Aug. 24, 1954